UNITED STATES PATENT OFFICE.

WILLIAM HOWELL, OF PHILADELPHIA, PENNSYLVANIA.

ARTIFICIAL STONE.

SPECIFICATION forming part of Letters Patent No. 291,734, dated January 8, 1884.

Application filed November 19, 1883. (No specimens.)

*To all whom it may concern:*

Be it known that I, WILLIAM HOWELL, of the city and county of Philadelphia, and State of Pennsylvania, have invented a new and useful Improvement in Artificial Stone, of which the following is a full, clear, and exact description.

My invention consists in a new and useful composition of matter forming artificial stone, applicable for building and other purposes, including pavements, drain-pipes, and other structures, also for plastering and other uses.

My composition consists of the following ingredients, combined in or about the proportions stated—that is, by measurement—namely: muriatic acid, two parts; flour of sulphur, two parts; molasses, three parts; iron scale, one part; sifted sand, three parts; Portland or other cement, two and one-half parts. In the preparation of this composition I take, for instance, white bar or other sand and sift it, then take iron scale—such as found in blacksmiths' shops and forges, and after pulverizing the same sift it, and next take Portland or other cement in a dry and pulverized condition. These several ingredients, in or about the proportions above named, I then mix thoroughly together, the whole forming a dry mass, ready for use in connection with the other ingredients when required. I then separately mix the muriatic acid, the flour of sulphur, and the molasses, preferably New Orleans molasses, together in or about the proportions named, and, when required to produce the artificial stone, thoroughly mix the solution or mixture thus formed with the mass of dry material, consisting of sand, iron scale, and cement, as hereinbefore described. This constitutes a plastic mass which may be molded or otherwise manipulated to the required shape of the stone or be otherwise worked to form a stone facing or covering, and which is afterward allowed to dry. This it will do naturally in from four to six days, more or less, and will make a hard and durable stone.

Having thus described my invention, I claim as new and desire to secure by Letters Patent—

The herein-described composition of matter to be used as artificial stone, consisting of muriatic acid, flour of sulphur, molasses, iron scale, sand, and cement, prepared and combined substantially as specified.

WILLIAM HOWELL.

Witnesses:
EDGAR TATE,
C. SEDGWICK.